United States Patent [19]

Sawamura et al.

[11] Patent Number: 5,696,642
[45] Date of Patent: Dec. 9, 1997

[54] CIRCUIT FOR CONTROLLING THE ROTATION OF A ROTATING MEMBER

[75] Inventors: Yo Sawamura; Toshihiro Tafuru, both of Kyoto, Japan

[73] Assignee: Rohm Co., Ltd., Kyoto, Japan

[21] Appl. No.: 351,895

[22] Filed: Dec. 8, 1994

[30] Foreign Application Priority Data

Dec. 8, 1993 [JP] Japan .................. 5-307772

[51] Int. Cl.⁶ .................. G11B 21/04; G11B 5/52; H02P 5/17; G05B 19/29
[52] U.S. Cl. .................. 360/70; 360/73.14; 388/811; 388/812; 388/912; 318/603; 318/606
[58] Field of Search .................. 360/70, 69, 73.01, 360/73.04, 73.14; 318/560, 603, 606, 607, 608; 388/809, 811–815, 820–829, 912

[56] References Cited

U.S. PATENT DOCUMENTS 4,885,793 12/1989 Tabuchi .................. 360/73.01
5,335,189 8/1994 Takayama et al. .................. 360/70
5,420,960 5/1995 Tabuchi .................. 388/800

Primary Examiner—Aristotelis M. Psitos
Assistant Examiner—Regina Y. Neal
Attorney, Agent, or Firm—Nikaido Marmelstein Murray & Oram LLP

[57] ABSTRACT

A circuit for controlling a rotating member is provided with an input capture register which reads out the value of a free running counter at a timing of an FG (frequency generated) pulse generated in accordance with a rotation of a rotating member. A central processing unit performs an interrupt operation based on a PG (phase generated) pulse generated in accordance with a rotation of the rotating member and an interrupt operation based on the FG pulse. A pulse width modulation circuit rotates the rotating member by use of a speed error signal and a phase error signal which are obtained by the interrupt operations of the central processing unit. A rotating member driver is also provided. The central processing unit calculates the phase error signal from an output of the input capture register based on an FG pulse generated after the generation of the PG pulse.

1 Claim, 5 Drawing Sheets

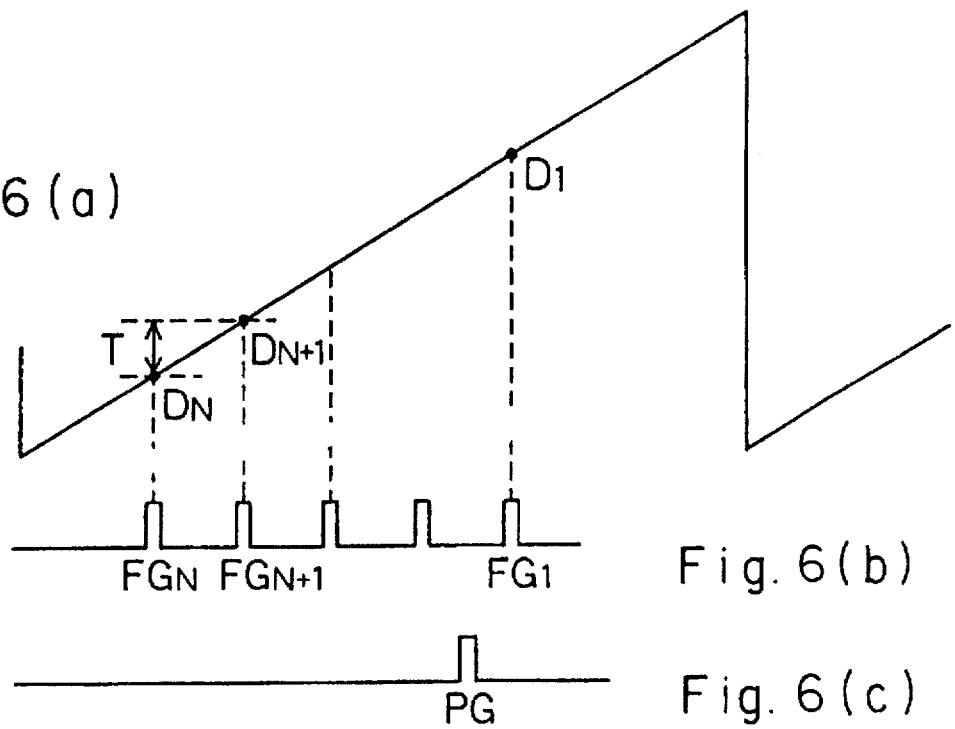

CIRCUIT FOR CONTROLLING THE ROTATION OF A ROTATING MEMBER

BACKGROUND OF THE INVENTION

1. Field of the Invention

The present invention relates to a control of a rotating member, and more particularly, to a control of the speed and phase of a rotating cylinder for use in a video tape recorder.

2. Description of the Prior Art

Referring to FIG. 1, there is shown a conventional circuit for controlling a rotating cylinder servo system for use in a video tape recorder. In association with a cylinder 2 rotated by a motor 1, an FG (frequency generated) pulse is generated by an FG (frequency generated) pulse generating device 3 and a PG (phase generated) pulse is generated by a PG (phase generated) pulse generating device 4. The FG and PG pulses are respectively transmitted to a first input capture register 8 and to a second input capture register 9 by way of amplifiers 5 and 6 also used for waveform shaping.

Reference numeral 7 represents a free running counter for counting a clock CLK. The first input capture register 8 reads out the value of the free running counter every time the FG pulse is input. The second input capture register 9 reads out the value of the free running counter every time the PG pulse is inputted.

The FG and PG pulses are also supplied to an interrupt signal generating circuit 10. The interrupt signal generating circuit 10 generates an interrupt signal in synchronism with each of the FG and PG pulses and supplies the interrupt signal to a controller 11 including a central processing unit (CPU). When an interrupt based on the FG pulse is applied, the controller 11 takes an output of the first input capture register 8 through a data bus 12, obtains the difference between the count values (values output from the first input capture register 8) of two succeeding FG pulses, and calculates the difference between the count value difference and a first reference value (reference value of the speed) stored in a memory in advance. Based on the difference, the controller 11 outputs a speed error signal.

When an interrupt based on the PG pulse is applied, the controller 11 takes the count value obtained when the PG pulse is input from the second input capture register 9, obtains the difference between the taken data and a second reference value (reference value of the phase) stored in a memory, and outputs a phase error signal based on the difference. The speed error signal and the phase error signal are both supplied to a pulse width modulation (PWM) circuit 13.

The PWM circuit 13 generates a PWM signal including the information on the speed error signal and the phase error signal. The PWM signal is smoothed by a smoothing circuit including a resistor R and a capacitor C, and then, is used to control the rotation of the motor 1 through a motor driver 14.

This conventional circuit uses two input capture registers: the first input capture register 8 used for speed control and the second input capture register 9 used for phase control, so that when this circuit is formed as an integrated circuit (IC), the number of gates increases to increase the area of the chip.

SUMMARY OF THE INVENTION

An object of the present invention is to provide a circuit for controlling the rotation of a rotating member with which the area of the chip is decreased.

A rotation controlling circuit of the present invention is provided with the following: a rotating member; a rotating member driving circuit; first pulse generating means for generating a first pulse at a short period in accordance with a rotation of the rotating member; second pulse generating means for generating a second pulse at a long period in accordance with a rotation of the rotating member; a free running counter for counting a clock pulse; an input capture register for reading out a value of the free running counter every time the first pulse is input; controlling means for obtaining a difference between two succeeding output values of the input capture register, obtaining a difference between the output value difference and a first reference value to output a speed error signal, and obtaining a difference between an output value of the input capture register corresponding to a specific first pulse generated after a generation of the second pulse and a second reference value to output a phase error signal; and means for correcting a rotation of the rotating member by use of the speed error signal and the phase error signal.

BRIEF DESCRIPTION OF THE DRAWINGS

This and other objects and features of this invention will become clear from the following description, taken in conjunction with the preferred embodiments with reference to the accompanied drawings in which:

FIGS. 6(a)–6(c) are views of assistance in explaining the operation of the embodiment of the present invention.

DESCRIPTION OF THE PREFERRED EMBODIMENTS

Figure 1:
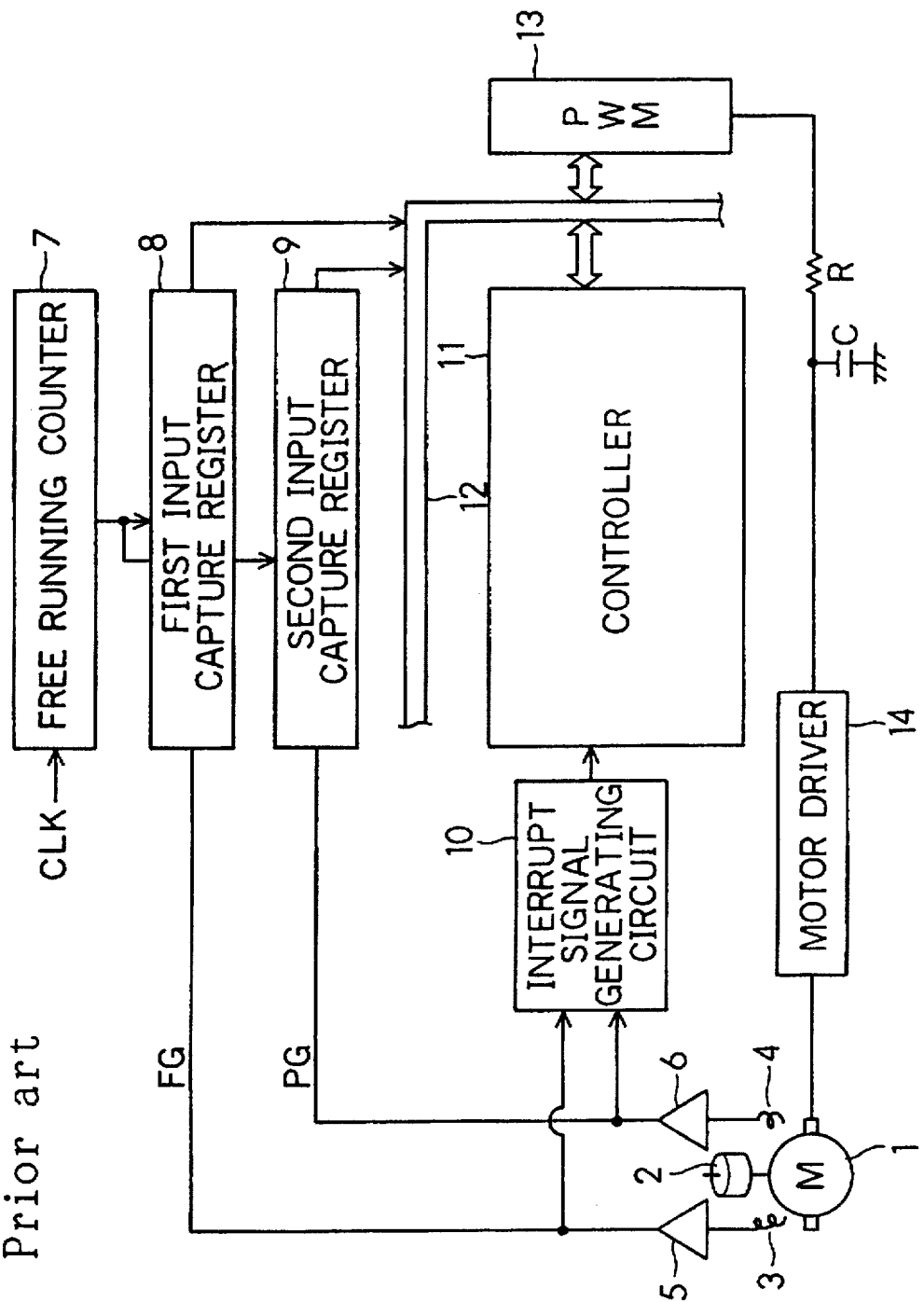
FIG. 1 is a block circuit diagram of a conventional rotation controlling circuit.
Figure 2:
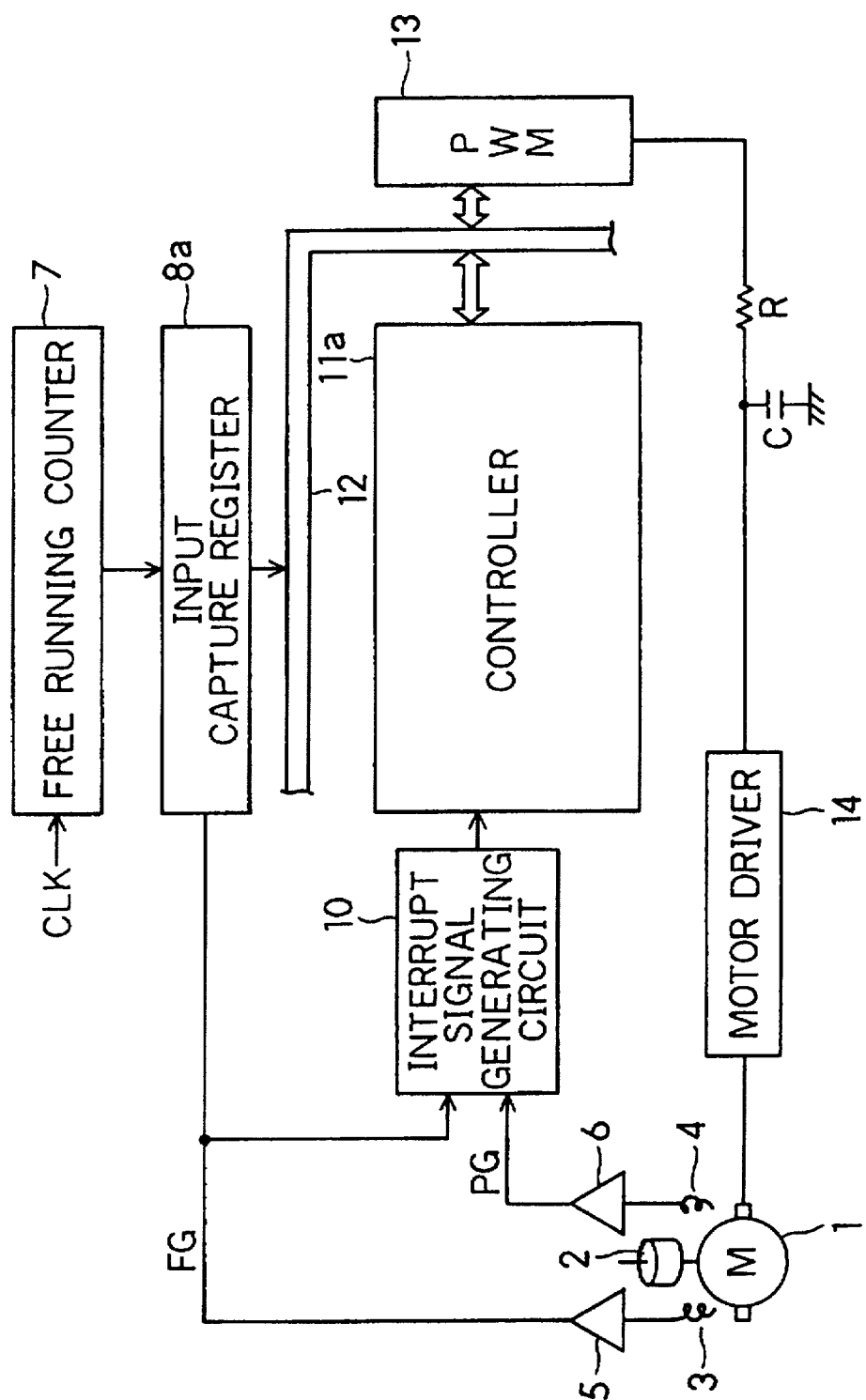
FIG. 2 is a block circuit diagram of a rotation controlling circuit embodying the present invention.

Hereinafter, an embodiment of the present invention will be described with reference to FIGS. 2 to 6. In the circuit of FIG. 2 embodying the present invention, the same portions and elements as those of the conventional circuit of FIG. 1 are identified by the same reference designations. A plurality of FG pulses are generated by the FG pulse generating device 3 every rotation of the cylinder 2 rotated by the motor 1, and one PG pulse is generated by the PG pulse generating device 4 every rotation of the cylinder 2. Thus, the FG pulse has a short generation period and the PG pulse has a long generation period. These pulses are supplied to the input capture register 8a by way of the amplifiers 5 and 6, respectively. In this embodiment, only one input capture register 8a is provided. As described later, the control by a controller 11a is slightly different from the control by the controller 11 of FIG. 1.

Reference numeral 7 represents a free running counter for counting the clock CLK. The input capture register 8a reads out the value of the free running counter every time the FG pulse is input.

The FG and PG pulses are also supplied to the interrupt signal generating circuit 10. The interrupt signal generating circuit 10 generates an interrupt signal in synchronism with each of the FG and PG pulses and supplies the interrupt signal to a controller 11a. When an interrupt based on the FG pulse is applied, the controller 11a takes an output of the input capture register 8a through the data bus 12, obtains the difference between the count values (values output from the input capture register 8a) of two succeeding FG pulses, and calculates the difference between the count value difference and a first reference value (reference value of the speed) stored in a memory in advance. Based on the difference, the controller 11a outputs a speed error signal.

When an interrupt based on the PG pulse is applied, the controller 11a takes from the input capture register 8a the count value obtained when the first FG pulse generated after the input of the PG pulse is input, obtains the difference between the taken data and a second reference value (reference value of the phase) stored in a memory, and outputs a phase error signal based on the difference. The speed error signal and the phase error signal are both supplied to the PWM circuit 13.

The PWM circuit 13 produces a PWM signal including the information on the speed error signal and the phase error signal. The PWM signal is smoothed by a smoothing circuit including a resistor R and a capacitor C, and then, is used to control the rotation of the motor 1 through the motor driver 14.

Figure 3:
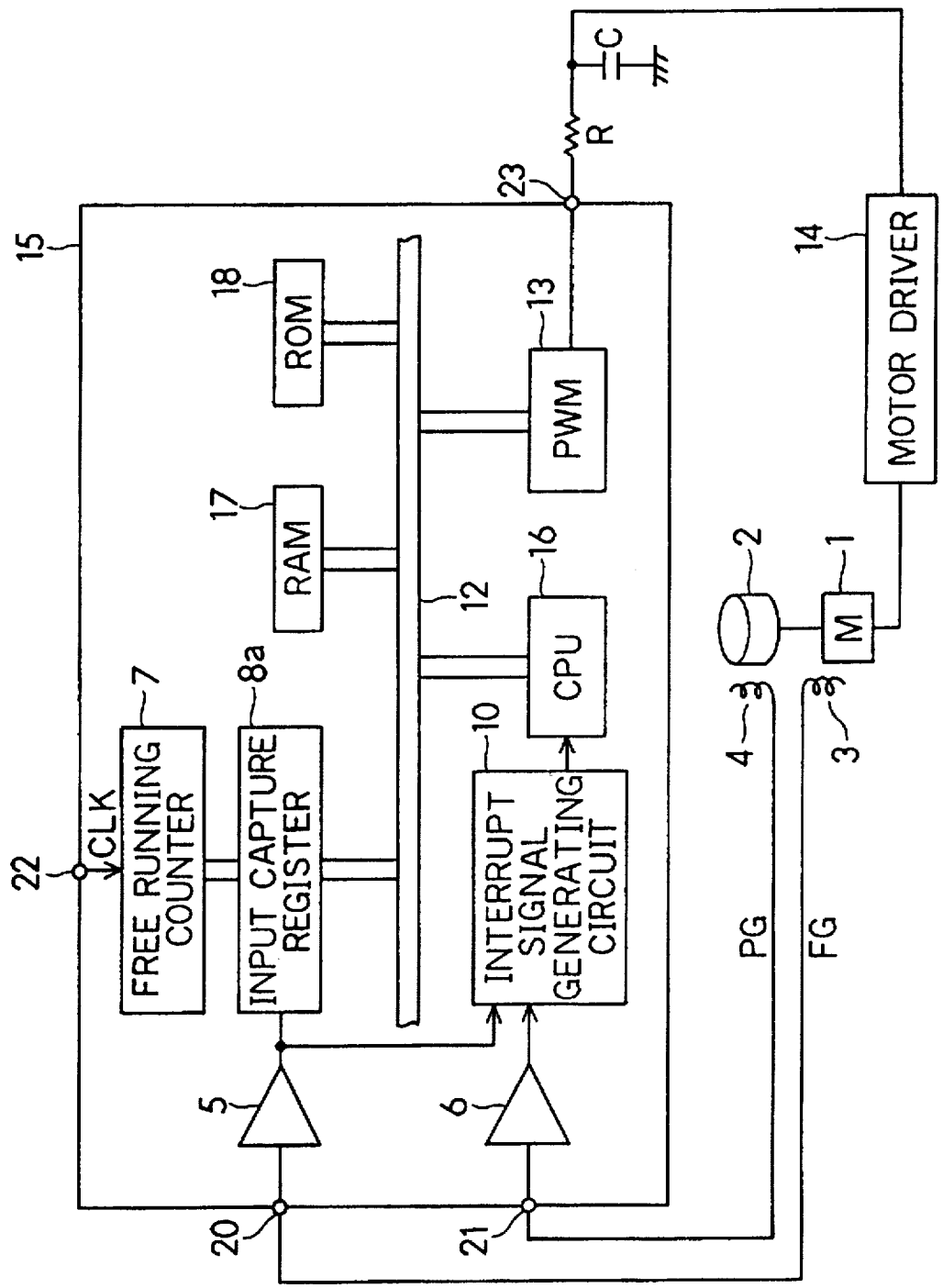
FIG. 3 is a specific circuit arrangement of the circuit of FIG. 2.

FIG. 3 shows the circuit of FIG. 2 in more detail. Reference numeral 15 represents an IC chip. Reference numeral 16 represents a CPU. Reference numeral 17 represents a random access memory (RAM). Reference numeral 18 represents a read only memory (ROM) having a program and a data table. The CPU 16, the RAM 17 and ROM 18 constitute the controller 11a of FIG. 2.

Subsequently, an operation by the controller 11a will be described. First, as shown in (a) of FIG. 6, the free running counter 7 increases its value as it counts the clock CLK. Although in actuality, the counting by the free running counter 7 does not show a sawtooth waveform (analog signal) as shown in (a) of FIG. 6 since it is performed in a digital manner, it is shown in an analog form in the figure for easier understanding.

The input capture register 8a reads out the value of the free running counter 7 every time FG pulses $FG_N$, $FG_{N+1}$,... are input. For example, the input capture register 8a reads out a count value $D_N$ in correspondence with the FG pulse $FG_N$ and a counter value $D_{N+1}$ in correspondence with the FG pulse $FG_{N+1}$.

The CPU 16 calculates the difference between the present and last output values of the input capture register 8a every time an interrupt based on the FG pulse is applied. For example, the CPU 16 calculates $D_N - D_{N+1} = T$. Then, the CPU 16 obtains the difference between T and a first reference value $T_0$ stored in the data table of the ROM 18, i.e. $T - T_0 = \Delta T$. This is set as a speed error value. When an interrupt based on the PG pulse is applied, the CPU 16 sets as $FG_1$ the FG pulse input immediately after the interrupt based on the PG pulse is applied, and takes out a counter value $D_1$ corresponding to $FG_1$ from the input capture register 8a.

Then, the CPU 16 obtains the difference between $D_1$ and a second reference value $D_0$ stored in the data table of the ROM 18, i.e. $D_1 - D_0 = \Delta D$. This is set as a phase error value. Then, an error signal based on the speed error value $\Delta T$ and the phase error value $\Delta D$ are supplied to the PWM circuit 13 through the data bus 12.

Figure 4:
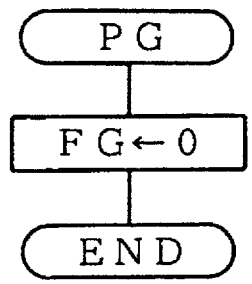
FIG. 4 is the flowchart of an interrupt by a CPU of the circuit of FIG. 2.
Figure 5:
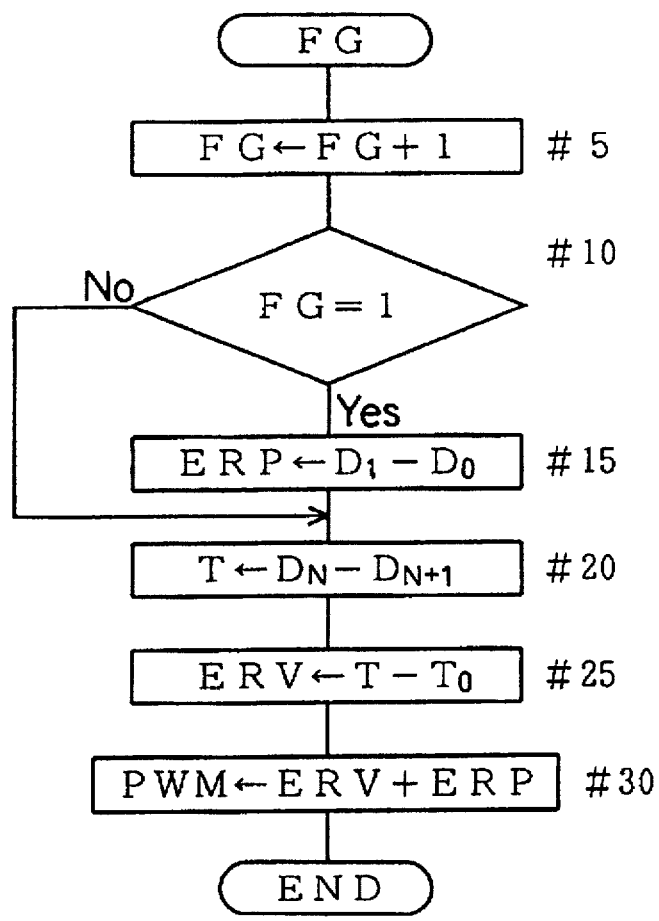
FIG. 5 is the flowchart of another interrupt by the CPU.

FIGS. 4 and 5 show the flowcharts of the interrupts by the CPU 16. FIG. 4 is the flowchart of the interrupt based on the PG pulse. FIG. 5 is the flowchart of the interrupt based on the FG pulse. In the interrupt based on the PG pulse, the CPU 16 only resets an FG register to 0. Then, the process returns.

In the interrupt based on the FG pulse, the FG register is incremented at step #5. Then, whether FG=1 or not is determined at step #10. When FG=1, $D_1 - D_0$ is set in a phase error register ERP at step #15. When FG≠1, step #15 is skipped.

Then, $D_N - D_{N+1}$ is input in a speed period register T at step #20. Then, the difference between T and the reference value $T_0$ is obtained at step #25. The difference $T - T_0$ is input in the speed error register ERV. The values of ERV and ERP are added and input in a PWM register. Then, this interrupt routine is finished. The data in the PWM register is supplied to the PWM circuit 13 at a predetermined timing.

As described above, according to the present invention, only one input capture register is necessary, so that the arrangement of the rotation controlling circuit is simplified. As a result, the area of the chip is reduced when the circuit is formed as an IC. Further, the cost of the rotation controlling circuit is reduced because of the reduction in number of input capture registers, so that the cost of the VTR incorporating the circuit is also reduced.

Obviously, many modifications and variations of the present invention are possible in light of the above teachings. It is therefore to be understood that within the scope of the appended claims, the invention may be practiced other than as specifically described.

What is claimed is:

1. A circuit for controlling a rotation of a rotating member, comprising:

a free running counter for counting a clock;

means for generating one phase generated pulse every rotation of a rotating member;

means for generating a plurality of input frequency generated pulses every rotation of the rotating member;

an input capture register for reading out a value of the free running counter at a timing of an input frequency generated pulse input thereto;

a controller means including a central processing unit and a FG register for storing the number of inputs of the frequency generated pulse, wherein said controller means sets the FG register to 0 when the phase generated pulse is input thereto and increments the FG register every time the frequency generated pulse is input, and when the FG register is 1 as a result of the increment, said controller means obtains a difference between an output of the input capture register corresponding to the first frequency generated pulse generated after input of the phase generated pulse and a predetermined phase reference value stored in a memory in advance to output a phase error signal, and when the FG register is not 1, said controller means obtains a difference between a predetermined speed reference value stored in said memory in advance and a difference between outputs of the input capture register of two succeeding frequency generated pulses to output a speed error signal; and a driving circuit for rotating the rotating member by use of the speed error signal and the phase error signal.

* * * * *